United States Patent [19]

Nimry et al.

[11] 4,358,579

[45] Nov. 9, 1982

[54] POLYIMIDES FROM TETRAMETHYLCYCLOBUTANE-1,2,3,4,-TETRACARBOXYLIC DIANHYDRIDE AND DIAMINES

[75] Inventors: Tayseer S. Nimry, Wheaton; Ellis K. Fields, River Forest, both of Ill.

[73] Assignee: Standard Oil Company (Indiana), Chicago, Ill.

[21] Appl. No.: 286,696

[22] Filed: Jul. 24, 1981

[51] Int. Cl.$^3$ .............................................. C08G 73/10
[52] U.S. Cl. .................................. 528/188; 528/125; 528/128; 528/189; 528/206; 528/208; 528/220; 528/229; 528/352; 528/353
[58] Field of Search .............. 528/353, 352, 220, 188, 528/189, 229, 206, 208, 125, 128

[56] References Cited

PUBLICATIONS

Nakanishi et al., Alephetic Poly (Amido Acids) and Polyimides (1973).

*Primary Examiner*—Lester L. Lee
*Attorney, Agent, or Firm*—Gunar J. Blumberg; William T. McClain; William H. Magidson

[57] ABSTRACT

Novel polyimides and molding compositions are prepared from tetramethylcyclobutane-1,2,3,4-tetracarboxylic dianhydride and diamines. Also glass and graphite filled polyimides are prepared. The polyimides are useful as engineering plastics.

20 Claims, No Drawings

POLYIMIDES FROM TETRAMETHYLCYCLOBUTANE-1,2,3,4,-TETRACARBOXYLIC DIANHYDRIDE AND DIAMINES

BACKGROUND OF THE INVENTION

1. Field of the Invention

The field of this invention relates to polyimides prepared from tetramethylcyclobutane-1,2,3,4-tetracarboxylic dianhydride (TMCDA) and diamines. These novel polyimides are useful in preparing molded articles, fibers, laminates and coatings.

2. Background

It is known to make polyimides from pyromellitic dianhydride and aromatic diamines. This is disclosed in U.S. Pat. No. 3,179,634 (1965). British Patent Specification No. 570,858 discloses various processes for making fiber forming polymers. The Japanese Patents listed below disclose the preparation of polyimides starting with cyclobutane-1,2,3,4-tetracarboxylic dianhydride.

JA 7123917-S27, JA 7137733-S44, JA 7137734-S44, JA 7219710-T23, and JA 72199098-T23. The article by F. Nakanishi and M. Hasegawa, Polymers, 14, 440 (1973) discloses the use of cyclobutane-1,2,3,4-tetracarboxylic dianhydride and 1,3-dimethylcyclobutane-1,2,3,4-tetracarboxylic dianhydride in the preparation of polyimides. In reviewing all these references, it is clear that the use of TMCDA to form polyimides useful as moldings, fibers, laminates, and coatings has not been contemplated in the prior art.

The general object of this invention is to provide novel polyimides based on TMCDA and diamine moieties. A more specific object of this invention is to provide polyimides from TMCDA moieties and aliphatic, cycloaliphatic, araliphatic and aromatic moieties. Another object is to provide a process for the manufacture of polyimides, from TMCDA and diamines.

We have found that novel polyimides can be formed by reacting TMCDA with diamines. TMCDA reacts readily with the diamine to form a high molecular weight polyimide. In this process both aliphatic and aromatic diamines can be polymerized with TMCDA to form high molecular weight polyimides.

Our process for the manufacture of the novel polyimides comprises reacting about equal molar amounts of TMCDA with a primary diamine. The molar ratio of TMCDA to the primary diamine may be in the range of 1.2:1 to 1:1.2, preferably in the range of 1 to 1. In suitable method, the reaction is conducted as a batch reaction at a temperature of about 130° to 300° C. for a period of about 2 to 24 hours in a nitrogen containing organic polar solvent such as 1-methyl-2 pyrrolidinone (NMP), N,N-dimethylacetamide, N,N-dimethylformamide or pyridine. The polycondensation can also be carried out as a continuous process. The polycondensation can suitably be carried out at a temperature of 130° C. to 300° C., preferably at a temperature of 180° to 200° C. The water by-product in these reactions may be distilled off at 100°–150° C., removed by a stream of nitrogen or azeotroped with an organic solvent such as xylene. The polymerization reaction can also be carried out in the melt under an inert atmosphere or in vacuum. The novel polyimides of this invention have the following recurring structure wherein R is a divalent aliphatic or aromatic hydrocarbon radical.

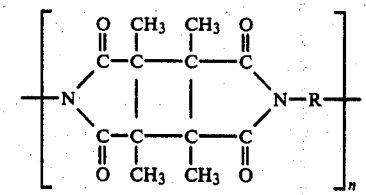

The radical R may be divalent aliphatic hydrocarbons of 2 to 18 carbon atoms or an aromatic hydrocarbon from 6 to 20 carbon atoms, or an aromatic hydrocarbon radical containing from 6 to 10 carbon atoms joined directly or by stable linkage comprising —O—, methylene,

—SO—, —SO$_2$—, and —S— radicals. The radical R is derived from aliphatic, araliphatic or cycloaliphatic diamines such as ethylenediamine, propylenediamine, 2,2-dimethylpropylenediamine, tetramethylenediamine, hexamethylenediamine, octamethylenediamine, nonamethylenediamine, decamethylenediamine, dodecamethylenediamine, 4,4'-diaminodicyclohexylethane, xylylene diamine and bis (aminomethyl) cyclohexane. Suitable aromatic diamines useful in Applicant's process include para and meta-phenylenediamine, 4,4'-oxydianiline, thiobis (aniline), sulfonylbis (aniline), diaminobenzophenone, methylenebis (aniline), benzidine, 1,5-diaminonaphthalene, oxybis (2-methylaniline), thiobis (2-methylaniline), and the like. Examples of other useful aromatic primary diamines are set out in U.S. Pat. Nos. 3,494,890 (1970) and 4,016,140 (1972) both incorporated herein by reference. The preferred diamines are 1,6-hexanediamine, 1,12-dodecanediamine and 4,4'-oxydianiline.

In some cases the polyimide may be further polymerized under "solid state polymerization" conditions. The term solid state polymerization refers to chain extensions of polymer particles under conditions where the polymer particles retain their solid form and do not become a fluid mass. The solid state polymerization can be carried out below the melting point of the polyimide and can be conducted in several ways. However all techniques require heating the ground or pelletized polyimide below the melting point of the polyimide, generally at a temperature of about 200° to 300° C. while either sparging with an inert gas such as nitrogen or operating under vacuum. In cases where the polyimides have a low melt temperature, they can be polymerized in the melt under vacuum in thin sections or using thin film reactors known in the art.

Injection molding of the novel polyimide is accompanied by injecting the polyimide into a mold maintained at a temperature of about 50° to 150° C. In this process a 20 second to 1 minute cycle is used with a barrel temperature of about 200° to 350° C. These temperatures will vary depending on the $T_g$ and $T_m$ of the polymer being molded.

The novel polyimides have excellent mechanical and thermal properties and can readily be molded into useful articles or formed into fibers, films, laminates or coatings. The physical tensile properties of the polyimide made with 1,12-dodecanediamine and the glass-reinforced polyimide are shown on Table 2. Infrared spectra of the polyimides have confirmed the polyimide structure.

Analysis of the TMCDA-diamine polyimide by thermal gravimetric analysis shows excellent stability. This is demonstrated by the fact that under nitrogen atmosphere 1% weight loss occurs at a temperature of about 300° C. and the main weight loss occurs at a temperature of about 400° C. Glass transition temperature $T_g$ of the polyimide varied with the particular diamine used as shown in the Examples. Values range from a $T_g$ of 60° C. to 285° C.

Diamines with the amino groups attached directly to the aromatic ring are suitably polymerized with TMCDA by solution condensation in organic polar solvents. Useful polar solvents include N,N-dimethylacetamide, 1-methyl-2-pyrrolidinone, N,N-dimethylformamide, pyridine, and the like.

We have found that the polyimides of this invention are improved by the addition of reinforcing material particularly the mechanical properties of the polyimides are improved if these polyimides contain from about 25 to 60 percent by weight glass fibers, glass beads, or graphite or mixtures thereof. In the preferred range the polyimides contain 30 to 40 percent by weight of the glass fibers, glass beads, or graphite or mixtures thereof. Suitably reinforcing materials can be glass fibers, glass beads, glass spheres, glass fabrics. The glass fibers are made of alkali-free boron-silicate glass or alkali containing C-glass. The thickness of the fiber is suitably on the average between 3 mm and 30 mm. It is possible to use both long fiber with average lengths of from 5 to 55 mm and also short fibers with an average filament length from 0.05 to 5 mm. In principle, any standard commercial-grade fibers especially glass fibers may be used. Glass beads ranging from 5 mm to 50 mm in diameter may also be used as a reinforcing material.

The reinforced polyimide polymers may be prepared in various ways. For example, so-called rovings endless glass fiber strands are coated with the polyamic acid and subsequently granulated. The cut fibers or the glass beads may also be mixed with polyamic acid solution and heated to form the reinforced polyimide. Injection molding of the novel glass-filled polyimide is accomplished by injecting the polyimide into a mold maintained at a temperature of about 50° to 150° C. In this process a 20 second cycle is used with a barrel temperature of about 200° to 300° C. The injection molding conditions are given in Table 1.

TABLE I

| Mold Temperature | 50 to 150° C. |
|---|---|
| Injection Pressure | 15,000 to 19,000 psi and held for 1 to 3 seconds |
| Back Pressure | 100 to 220 psi |
| Cycle Time | 20 seconds |
| Extruder: | |
| Nozzle Temperature | 200 to 350° C. |
| Barrels: | |
| Front heated to | 200 to 350° C. |
| Screw: | |
| 20 to 25 revolutions/minute | |

The mechanical properties of the polyimide of the glass reinforced polyimides are given in Table 2, and show that these polyimides have excellent mechanical and thermal properties.

The following examples illustrate the preferred embodiment of the invention. It will be understood that the examples are for illustrative purposes only and do not purport to be wholly definitive with respect to conditions or scope of the invention.

EXAMPLE 1

The reaction between TMCDA and 4,4-oxydianiline (ODA) was carried out under a nitrogen atmosphere and anhydrous conditions. The procedure involves the use of a three-neck flask containing a teflon-coated magnetic stirrer and fitted with a drying tube. The solid TMCDA, 3.15 g (0.0125 mole) was added to a solution of ODA, 2.50 g (0.0125 mole) in 40 ml NMP. The addition funnel was washed with 10 ml of NMP. The mixture was stirred at 80° C. for 1.5 hour. The temperature was increased to 180° C. when 15.5 ml of the solvent was distilled-off along with most of the water by-product. The mixture was then refluxed for 20 hr. (oil bath temperature was 230° C.). The hot solution was mixed with water in a blender. The product was filtered, washed with hot water then dried in a vacuum oven at 120° C. for several hours. The yield was 93%. The inherent viscosity of the polyimide, determined for a solution made by dissolving 0.1 g of the polyimide in a 25 ml of mixture of 60/40 phenol-tetrachloroethane (P/TCE) at 130° C. then cooling to 30° C., a procedure used in all the other examples, was 0.40. Analysis: Calcd. for polyimide: C, 69.23; H, 4.80; N, 6.73. Found: C, 68.84; H, 5.72; N, 6.55.

EXAMPLE 2

A solution of ODA, 1.25 g ($6.25 \times 10^{-3}$ mole) in 10 ml NMP was added dropwise to a solution of TMCDA, 1.58 g ($6.25 \times 10^{-3}$ mole) in 16 ml of NMP that was heated in an oil bath at 150° C. The temperature was increased to reflux and after 1 hr. 10 ml of NMP, that contained most of the water by-product was distilled-off. The mixture was allowed to reflux for an additional 18 hr. The mixture was worked-up as in Example 1 above. Yield, 91%. The inherent viscosity was determined in P/TCE to be 0.69. Analysis; Calcd. for polyimide: see Example 1. Found: C, 68.01; H, 4.91; N, 6.62.

EXAMPLE 3

The reaction between TMCDA and 1,6-hexanediamine was carried out under a nitrogen atmosphere and anhydrous conditions. The procedure involves the use of a three-neck flask containing a teflon-coated magnetic stirrer and fitted with a drying tube. The diamine (0.025 mole) was added to the flask and dissolved with 60 ml of NMP and allowed to stir under a fast stream of nitrogen (dried over $H_2SO_4$) for 0.5 hr. The dianhydride TMCDA (0.025 mole) was then added to the flask through a dried powder funnel over 15-20 minutes. Residual dianhydride was then washed with enough solvent to make approximately 7-10% solution. Stirring was continued at a low temperature of about 40° C. until a clear solution containing the low-molecular-weight polyamic acid resulted. The was followed by heating at a higher temperature, about 135° C. for 4 hr. The solution, which gelled upon cooling, was mixed with water in a blender. The solid was filtered and washed with boiling water, then dried in a vacuum oven at 100° C. for several hours. The polyimide had an inherent viscosity of 0.55 determined in P/TCE. Its $T_g$ was determined to be 100° C. and $T_m$ 340° C. Elemental analysis of the polyimides was as follows:

|  | C | H | N |
|---|---|---|---|
| Calcd. | 65.06 | 7.23 | 8.43 |
| Found | 64.10 | 7.36 | 8.18 |

EXAMPLE 4

The procedure of Example 3 was repeated except that the polyamic acid was heated at a higher temperature of about 200° C. The inherent viscosity of the polyimide determined in P/TCE was 0.5.

EXAMPLE 5

The reaction between TMCDA and 1,12-dodecanediamine was carried out under a nitrogen atmosphere and anhydrous conditions. The procedure involves the use of a three-neck flask containing a teflon-coated magnetic stirrer and fitted with a drying tube. The diamine (0.025 mole) was added to the flask and dissolved with 60 ml of NMP and allowed to stir under a fast stream of nitrogen (dried over $H_2SO_4$) for 0.5 hr. The dianhydride TMCDA (0.025 mole) was then added to the flask through a dried powder funnel over 15–20 minutes. Residual dianhydride was then washed with enough solvent to make approximately 7–10% solution. Stirring was continued at a low temperature of about 40° C. until a clear solution containing the low-molecular-weight polyamic acid resulted. This was followed by heating at a higher temperature of about 140° C. for 4 hr. The solution, which gelled upon cooling, was mixed with water in a blender. The solid was filtered and washed with boiling water, then dried in a vacuum oven at 100° C. for several hours. The polyimide had an inherent viscosity of 0.54 determined in P/TCE. It had a $T_g$ of 64° C. and $T_m$ of 232. Elemental analysis of the polyimide was as follows:

|  | C | H | N |
|---|---|---|---|
| Calcd. | 69.23 | 8.65 | 6.73 |
| Found | 68.80 | 8.59 | 6.52 |

EXAMPLE 6

The procedure of Example 5 was repeated except that the polyamic acid was heated at a higher temperature of about 200° C. and had an inherent viscosity of 0.65 determined in P/TCE.

EXAMPLE 7

A polyimide prepared according to the procedures of Examples 5 and 6 that had an I.V. of 1.18 had the following properties set forth in Table 2.

TABLE 2

| Property | ASTM Method | TMCDA+ 1,12-dodecanediamine Polyimide (As Molded) | Polyimide 30% Glass |
|---|---|---|---|
| Heat Deflection Temp., °F. @ 264psi | D-48 | 165 | 403 |
| Flexural Modulus, psi | D-790 | 188,000 | 1,120,000 |
| Flexural Strength, psi | D-638 | — | 27,000 |
| Yield Tensile Str, psi | D-638 | 4,300 | — |
| Elongation at Yield, % | D-638 | 4.2 | — |
| Ultimate Tensile Str, psi | D-308 | 5,400 | 17,800 |
| Elongation at Break, psi | D-630 | 305 | 4.5 |
| Tensile Impact Str, psi | D-638 | 192 | 72.5 |
| Izod Impact, Ft-lb/in | D-256 | 1.04 (4) No Break (1) | 1.8 |
| % H2O Absorption at 100% Relative Humidity | — | 0.8 | |

EXAMPLE 8

A polyimide was prepared according to the procedures of Examples 5 and 6. 70 grams of the polyimide was dry blended with 30 grams of PPG3531 glass fiber. The product was then injection molded. The physical properties are shown in Table 2.

EXAMPLE 9

Starting materials

The dianhydride, TMCDA, was prepared from maleic anhydride according to literature procedures. Treatment of maleic anhydride in boiling acetic acid and in the presence of 2-aminopyridine gives with decarboxylation 2,3-dimethylmaleic anhydride (M. E. Baumann and H. Bosshard, *Helv. Chim. Acta*, 16, 2751 (1978)). This compound is then converted to its dimer by irradiating its benzene solution sensitized by benzophenone with ultraviolet light for several hours. The resulting photodimer was recrystallized from acetic anhydride or a large volume of acetone. The literature procedure (G. D. Schenk, W. Hartmann, S. P. Mansfeld, W. Metzner, and C. H. Krauch, *Chem. Ber.*, 95, 1642 (1962) has been improved by using a weak UV source through Pyrex, and has a considerable advantage over Schenk et al., who used a medium-pressure mercury arc through quartz. Our improved method makes possible the manufacture of TMCDA by a continuous process of pumping a benzene solution of dimethylmaleic anhydride in benzene containing 1–7 wt% of benzophenone around pyrex glass piping under irradiation by the sun, i.e., using cheap and inexhaustible solar radiation.

We claim:

1. A polyimide consisting essentially of the following recurring structure:

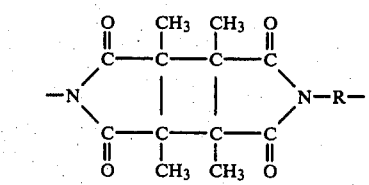

wherein R is a divalent aliphatic, cycloaliphatic, araliphatic or aromatic hydrocarbon radical.

2. The polymer of claim 1 wherein R is an aliphatic hydrocarbon from 2 to 18 carbon atoms.

3. The polyimide of claim 1 wherein R is an aromatic hydrocarbon from 6 to 20 carbon atoms.

4. The polyimide of claim 1 wherein the aromatic hydrocarbon radical contains from 6 to 10 carbon atoms joined directly or by stable linkage selected from the group consisting of —O—, methylene,

—SO—, —SO$_2$— and —S— radicals.

5. The polyimides of claim 1 wherein the polyimide is in the form of a molded object.

6. The polyimide of claim 1 wherein the polyimide is in the form of a laminate.

7. The polyimide of claim 1 wherein the polyimide is in the form of a film.

8. The polyimide of claim 1 wherein the polyimide is in the form of a metal coating suitable for electrical service.

9. A polyimide consisting essentially of the following recurring structure:

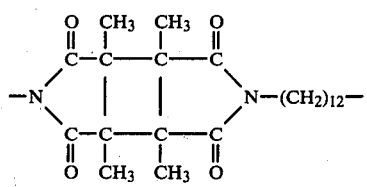

10. A polyimide of claim 9 wherein the polyimide is in the form of a molded object.

11. The polyimide of claim 9 wherein the polyimide is in the form of a laminate.

12. The polyimide of claim 9 wherein the polyimide is in the form of a film.

13. A polyimide consisting essentially of the following recurring structure:

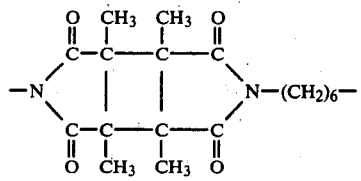

14. A polyimide of claim 13 wherein the polyimide is in the form of a molded object.

15. The polyimide of claim 13 wherein the polyimide is in the form of a laminate.

16. The polyimide of claim 13 wherein the polyimide is in the form of a film.

17. A polyimide consisting essentially of the following recurring structure:

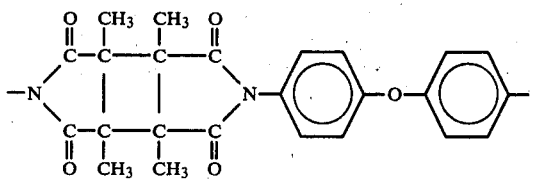

18. The polyimide of claim 17 wherein the polyimide is in the form of a molded object.

19. The polyimide of claim 17 wherein the polyimide is in the form of a laminate.

20. The polyimide of claim 17 wherein the polyimide is in the form of a film.

* * * * *

UNITED STATES PATENT AND TRADEMARK OFFICE
CERTIFICATE OF CORRECTION

PATENT NO. : 4,358,579

DATED : November 9, 1982

INVENTOR(S) : Tayseer S. Nimry et al.

It is certified that error appears in the above-identified patent and that said Letters Patent is hereby corrected as shown below:

Column 1, line 25, "14" should read -- <u>14</u> --.

Column 2, line 31, "para and meta-" should read -- <u>para</u> and <u>meta-</u> --.

Column 3, line 32, "5 to 55 mm" should read -- 5 to 50 mm --.

Column 4, line 60, "The was" should read -- This was --.

Column 6, line 36, "16" should read -- <u>16</u> --.

Column 6, line 43, "95" shouod read -- <u>95</u> --.

Signed and Sealed this

Twenty-second Day of November 1983

[SEAL]

Attest:

GERALD J. MOSSINGHOFF

Attesting Officer

Commissioner of Patents and Trademarks